US006961757B2

(12) United States Patent
Ueda

(10) Patent No.: US 6,961,757 B2
(45) Date of Patent: Nov. 1, 2005

(54) SYSTEM AND METHOD FOR DELIVERING E-MAIL DATA TO A TERMINAL VIA A RELAY CENTER BY MULTIPLEXING AND BROADCASTING E-MAIL DATA WITH BROADCASTING PROGRAM DATA

(75) Inventor: Eiji Ueda, Hiroshima-Ken (JP)

(73) Assignee: Matsushita Electric Inducstrial Co., Ltd., Osaka-Fu (JP)

( * ) Notice: Subject to any disclaimer, the term of this patent is extended or adjusted under 35 U.S.C. 154(b) by 802 days.

(21) Appl. No.: 09/939,710

(22) Filed: Aug. 28, 2001

(65) Prior Publication Data

US 2002/0049820 A1 Apr. 25, 2002

(30) Foreign Application Priority Data

Aug. 28, 2000 (JP) ....................................... 2000-256912

(51) Int. Cl.[7] ........................ G06F 15/16; G06F 15/173

(52) U.S. Cl. ....................... 709/206; 709/227; 709/238; 709/245

(58) Field of Search ................................ 709/206, 218, 709/229, 231, 227, 238, 245; 725/54, 105

(56) References Cited

U.S. PATENT DOCUMENTS

| | | | | |
|---|---|---|---|---|
| 6,212,553 | B1 * | 4/2001 | Lee et al. | 709/206 |
| 6,412,112 | B1 * | 6/2002 | Barrett et al. | 725/54 |
| 6,507,950 | B1 * | 1/2003 | Tsukidate et al. | 725/54 |
| 6,636,890 | B1 * | 10/2003 | Mandalia | 709/206 |
| 6,711,620 | B1 * | 3/2004 | Yoshii et al. | 709/229 |
| 6,795,863 | B1 * | 9/2004 | Doty, Jr. | 709/231 |
| 2002/0026496 | A1 * | 2/2002 | Boyer et al. | 709/218 |
| 2003/0126612 | A1 * | 7/2003 | Ikeda et al. | 725/105 |

* cited by examiner

*Primary Examiner*—Rupal Dharia
*Assistant Examiner*—Quang N. Nguyen
(74) *Attorney, Agent, or Firm*—McDermott Will & Emery LLP

(57) ABSTRACT

The invention relates to a broadcasting system, an e-mail delivery device, a delivery method, an e-mail integrated server and a program therefore.

The invention has an object to provide the broadcasting system and the e-mail delivery device that can carry out the delivery of e-mail data by means of the broadcasting practically, and enable to deliver the e-mail data together with the simultaneity by the broadcasting even in a case where a terminal can move.

The invention provides the broadcasting system and the e-mail delivery device provided with the relay center comprising the multiplexing means for multiplexing the e-mail data addressed to the terminal included in the relay area of the relay center with the broadcasting program data.

9 Claims, 9 Drawing Sheets

FIG. 8

| E-MAIL ADDRESS (531) | MAIL RECEIVING FLAG (532) | POSITION INFORMATION (533) | TERMINAL ID (534) |
|---|---|---|---|
| usr1@domain-w.com | 1 | 140, 36 | 090xxxaapov |
| usr2@domain-w.com | 1 | 138, 36 | 090x78a6aq |
| usr3@domain-w.com | 0 | 135, 35 | UNKOWN |
| ... | ... | ... | ... |

SYSTEM AND METHOD FOR DELIVERING E-MAIL DATA TO A TERMINAL VIA A RELAY CENTER BY MULTIPLEXING AND BROADCASTING E-MAIL DATA WITH BROADCASTING PROGRAM DATA

BACKGROUND OF THE INVENTION

1. Technical Field

This invention relates to a broadcasting system, an e-mail delivery device, a delivery method, an e-mail integrated server and a program therefor. And more particularly, this invention relates to the broadcasting system, the e-mail delivery device, the delivery method, the e-mail integrated server and the program therefor that enable to multiplex e-mail data with broadcasting program data and deliver said data.

2. Prior Art of the Invention

As the broadcasting has get digitalized in recent years, peoples are now giving attention to a communication system of the broadcasting characterized by delivering a mass of data to many destinations at high speed, simultaneously and immediately. The e-mailing system can be considered as one of applications effectively utilizing the broadcast communication. The e-mailing system, which needs a receiving route and a sending route for e-mail data, can establish the receiving route in an extremely wide area by means of the broadcasting. In addition, the system has a merit that a user does not need to pay charges for the line used for incoming mails because he can know arrivals of e-mail data immediately without connecting other circuits like a telephone line. Besides, the e-mail data mentioned here contain two parts: one is an information part called a header such as a destination of a message, a destination of a return mail, and etc. that are needed for executing services, and another is a message text called a body.

The first prior art is to deliver e-mail data by the broadcasting, which disclosed in Japanese laid-open publication No. 11-8649. The first prior art has described a mechanism of informing a user's terminal that e-mail data were arrived at a relay center by means of the wireless communication or by broadcasting the broadcasting program data multiplexed with e-mail data (broadcasting data). Provided that the "relay center" defined in the first prior art should be "a station for relaying an e-mail data". When the user receives the incoming of e-mail data by a terminal such as a television, he can receive the e-mail data by connecting with the Internet through the telephone line, for example.

In addition, the second prior art is disclosed in Japanese laid-open publication No. 11-355349. The second prior art is as follows. A transmitting center sends out a broadcasting program data multiplexed with a flag representing the incoming of e-mail. When a terminal confirms the flag, the terminal sends a request to send the e-mail data to the transmitting center by means of the telephone line or the like. Subsequently, after receiving the request to send the transmitting station multiplexes the corresponding e-mail data with the broadcasting program data, and then transmits said data to the terminal. The terminal can receive the e-mail data multiplexed with the broadcasting program data.

The first and second techniques include the following procedures: the information, for example, representing the incoming of e-mail data, is temporarily added to the broadcasting program data and then the broadcasting program data is sent out. After receiving the response from a terminal corresponding to the information representing the incoming of e-mail data, the transmitting center delivers the e-mail data. Such procedures can be considered to be based on under-mentioned reason.

That is to say, in case of delivering e-mail data using the above-mentioned broadcasting, all of users must share the data transmission band. Therefore, if the number of users increases, the data transmission band per user is restricted. Suppose that e-mail data of 1024 Bytes (–8192 bits) is delivered to ten million users, for example. The required time to transmit the e-mail to whole users is estimated to be about 67 hours in the CS (Communication Satellite) digital broadcasting (at the transmission rate of maximum 34 Mbps), or about 44 hours in the BS (Broadcast Satellite) digital broadcasting (at the transmission rate of maximum 52 Mbps), or about 99 hours in the terrestrial wave digital broadcasting (at the transmission rate of maximum 23 Mbps).

The above estimation examples are based on the assumption that all of the transmission bands of the regular broadcasting are used for the e-mail data. However, since the broadcasting program data must be delivered at the time of operation, the transmission band available for the e-mail data is limited more and the required time get longer. Therefore, if the e-mail data is to be delivered together with the broadcasting program data to all of users, the delivery interval of the e-mails gets too long to finish the delivery of e-mail data as the services.

Accordingly, the first and second prior arts solve the above-mentioned problems by the following method: by adding to the broadcasting program data the information of the incoming of e-mail temporarily, only the necessary (requested) e-mail data is to be delivered alternatively.

However, it is arranged in the prior arts as described above that after receiving information of the incoming of e-mail the receiving-end terminal must send any notification to the sending-end via the other line again. Recently the transmission rate of the line becomes speedier than before. Consequently, even when the e-mail data is received by means of the other line, the receiving-end can receive the mass of e-mail data at high speed. Therefore, it can be said that there is not a merit in the broadcasting that can deliver a mass of data at high-speed. In result, the merits at the time of receiving e-mail data by the broadcasting can be found in the immediacies and the broadcasting communication. The first and second prior arts can satisfy the broadcasting communication, but it is doubtful that those prior arts can satisfy the immediacies. Specifically, knowing the incoming of e-mail data satisfies the immediacies, but the content of the e-mail data are not transmitted. Accordingly, after being informed of the incoming of e-mail data, the receiving-end must execute any operation (any processing) to receive the e-mail data again. It cannot be said that there is sufficient immediacies.

SUMMARY OF THE INVENTION

The invention is proposed on the basis of the conventional subjects and has an object to provide the broadcasting system, the e-mail delivery device, the delivery method, the e-mail integrated server and the program, which can deliver e-mail data practically by means of the broadcasting, is characterized by the immediacies, and can deliver e-mail data to a mobile terminal by the broadcasting.

The invention adopts the following means in order to achieve the above object. That is to say, the invention presupposes that the broadcasting system comprises a parent station and relay centers for relaying broadcasting program data broadcasted by the parent station to parts of districts.

The relay center is provided with multiplexing means. The multiplexing means multiplexes the broadcasting program data with the e-mail data addressed to a terminal in the relay area of the relay center.

By allocating a place multiplexing the e-mail data to the relay center, the e-mail data to be delivered can be limited to those addressed to users (terminals) included in the relay center at the maximum. Therefore, the delivery of e-mail data by the broadcasting can be carried out practically. In addition, the number of users included in the relay center gets reduced so that the contents of e-mail data can be contained in the broadcasting. Differing from the conventional operations that the information of the incoming of e-mail data is added to the broadcasting, the invention can carry out the effective delivery of e-mail data including the sufficient immediacies.

Besides the relay area may be an area including the number of terminals capable of e-mail data within a specific time.

Moreover, the each relay center is configured so as to having respective domain parts different from each other. Consequently, since the e-mail can be delivered to the object relay center automatically, the conventional technique can be available for the e-mail delivery without change.

Further more, the broadcasting system is provided with an e-mail integrated server. The e-mail integrated server comprises mail receiving means for receiving e-mail data addressed to a terminal, position management means for acquiring position information of the terminal to which the received e-mail data should be transmitted, relay center selecting means for selecting a relay center corresponding to the position information acquired by the position management means, mail sending means for sending the e-mail data received by the mail receiving means toward the relay center selected by the relay center selecting means.

As described above, registering the position of the user (terminal) by the e-mail integrated server and transferring the e-mail data to the relay center of the relay area including the position becomes possible to deliver e-mail data to mobile users by the broadcasting.

Additionally, the mail sending means included in the e-mail integrated server may be arranged so as to send the e-mail data received by the mail receiving means toward the relay center on the basis of a flag representing whether the e-mail data should be delivered by the broadcasting or not.

Under such configuration, there is other transmission method except the method of transmitting the e-mail data by the broadcasting; thereby the e-mail data that were not transmitted by the broadcasting can be delivered to users certainly. It is possible to cope with the delay of the delivery or the failure of the receiving in case of a mass of e-mails.

Besides, the e-mail integrated server may comprises mail receiving method setting means for changing the mail receiving flag on the basis of the user's instruction.

In this case, when the receiving status of the broadcasting changes as the moving, the user can change the proper receiving route freely. Therefore, the user can utilize the receiving route like when the user is in the bad receiving condition, he can receive the e-mail data by the other line, on the other hand, when he is in the good receiving condition, he can receive the e-mail data by the broadcasting immediately and no charge.

The e-mail delivery device and the e-mail integrated server can be materialized by a computer. In this case, operating a program on the computer can materialize the multiplexing means, the position management means, the mail receiving means, the mail sending means, relay center selecting means, and mail receiving method setting means.

BRIEF DESCRIPTION OF THE DRAWINGS

FIG. 8 is a diagram showing a configuration of user list.

DESCRIPTION OF THE PREFERRED EMBODIMENTS

The following explanation refers to preferred embodiments of this invention according to the attached drawings and is submitted in order to understand the invention. Besides, the embodiments are only examples materializing the invention, and do not restrict the technical field of the invention.

Figure 9:
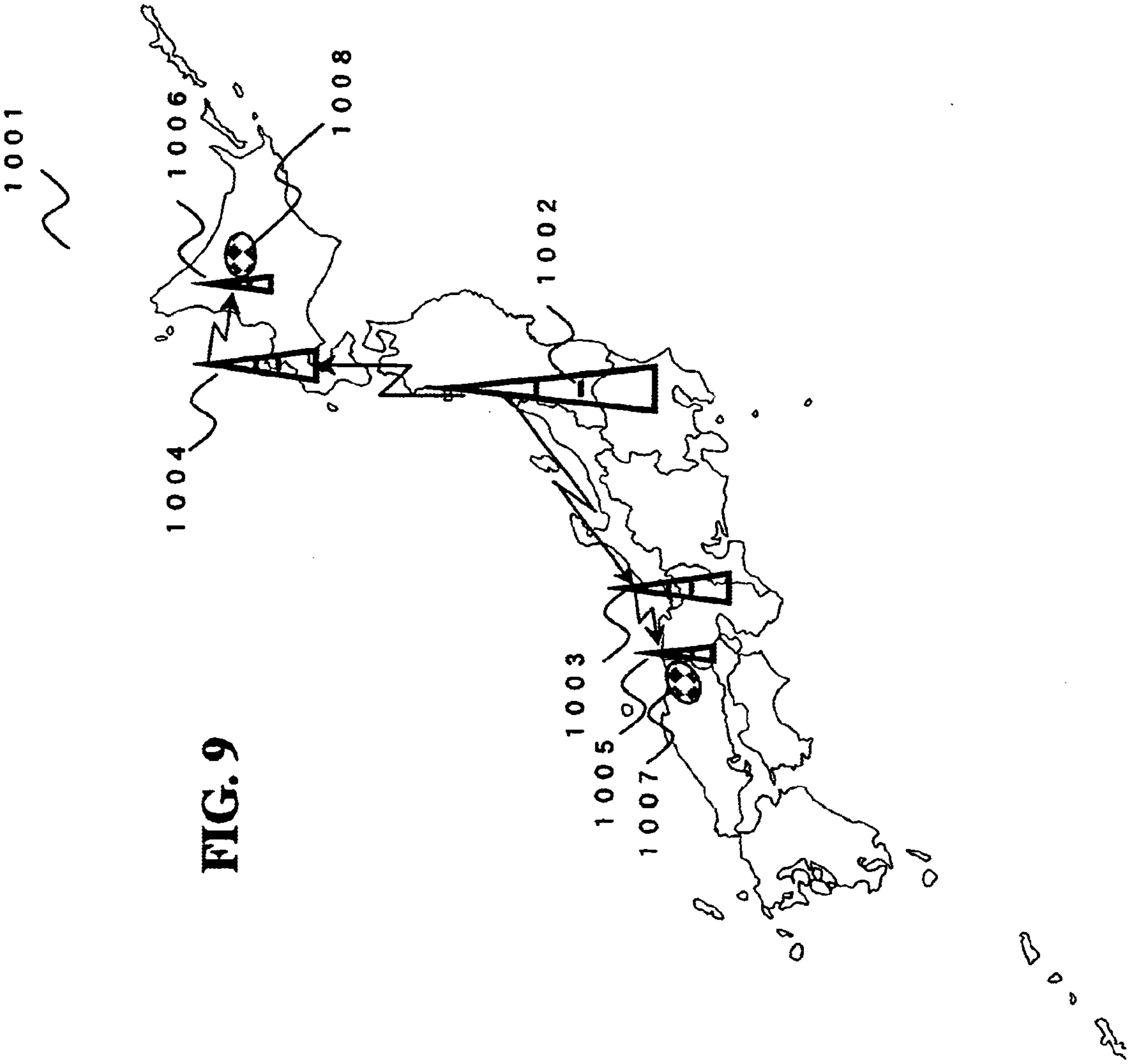
FIG. 9 is an image view showing a delivery method of broadcasting program data.

Before explaining the invention, here is explained the representative technology regarding the delivery method of the broadcasting program. FIG. 9 shows a case where a parent station 1002 broadcasts a specific program all over Japanese islands 1001. In this case, the parent station 1002 transmits prepared and edited video and audio data to a plurality of relay centers (relay centers 1003 and 1004) as broadcasting program data. The transmission of the broadcasting program data is executed by means of the microwaves, and is different from the broadcasting waves received at home in general.

After receiving the microwaves, the relay centers 1003 and 1004 transmit the broadcasting program data to relay centers 1005 and 1006 to relay the broadcasting program data to homes. After receiving the broadcasting program data, the relay centers 1005 and 1006 deliver the broadcasting program data to a narrow area like areas 1007 and 1008 by means of the broadcasting waves that every home can receive. Terminals set up in areas 1007 and 1008, which are included in areas 1007 and 1008, receives the broadcasting data via antenna or the like, and then reproduce the video and audio data. Besides, there is a case that the relay centers are provided on a plurality of stages. On the basis of the aforementioned aspects, the preferred embodiments are explained hereafter.

[Embodiment 1]

Figure 1:
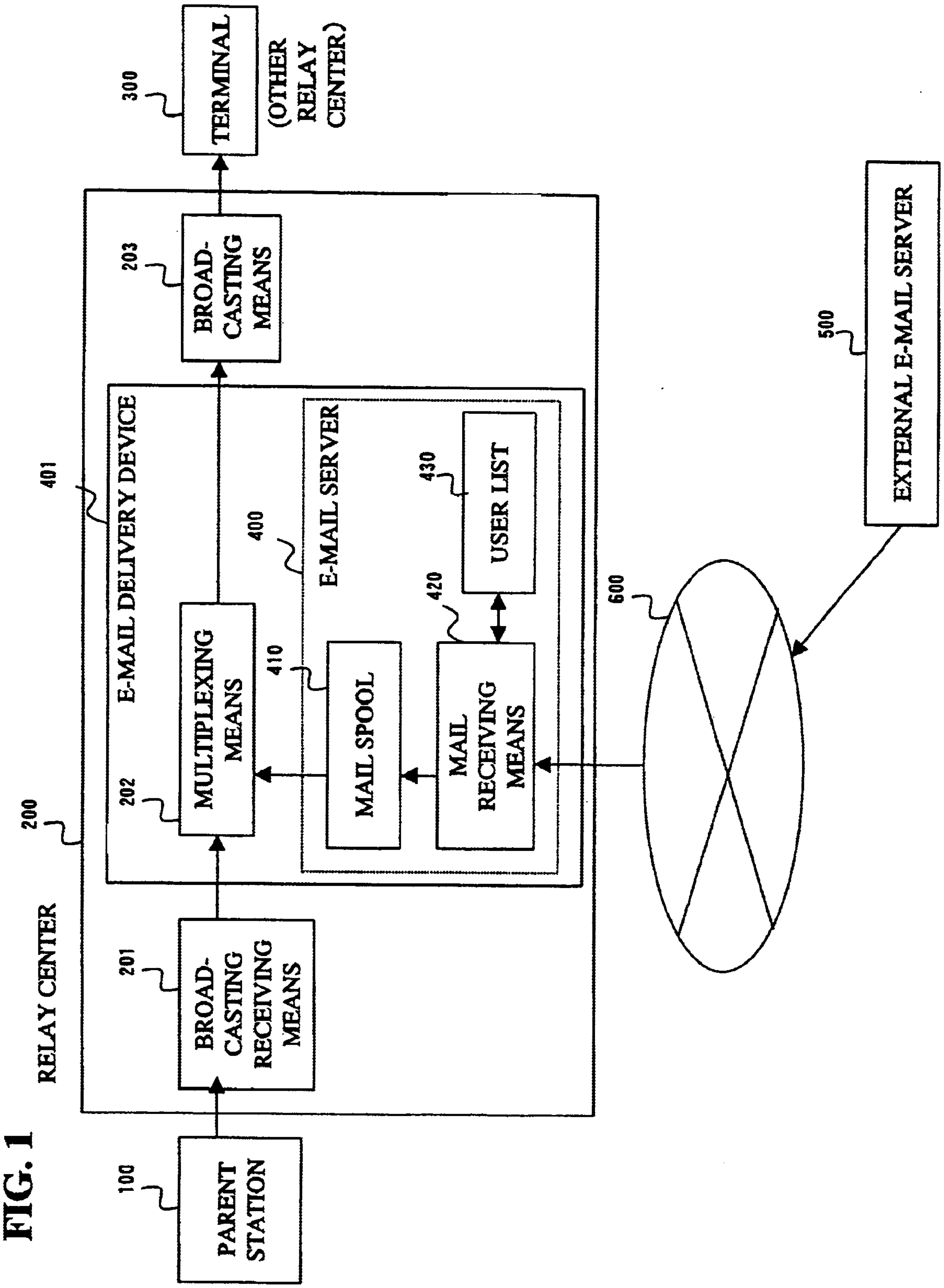
FIG. 1 is a block diagram showing a schematic configuration of an e-mail delivery device.
Figure 2A:
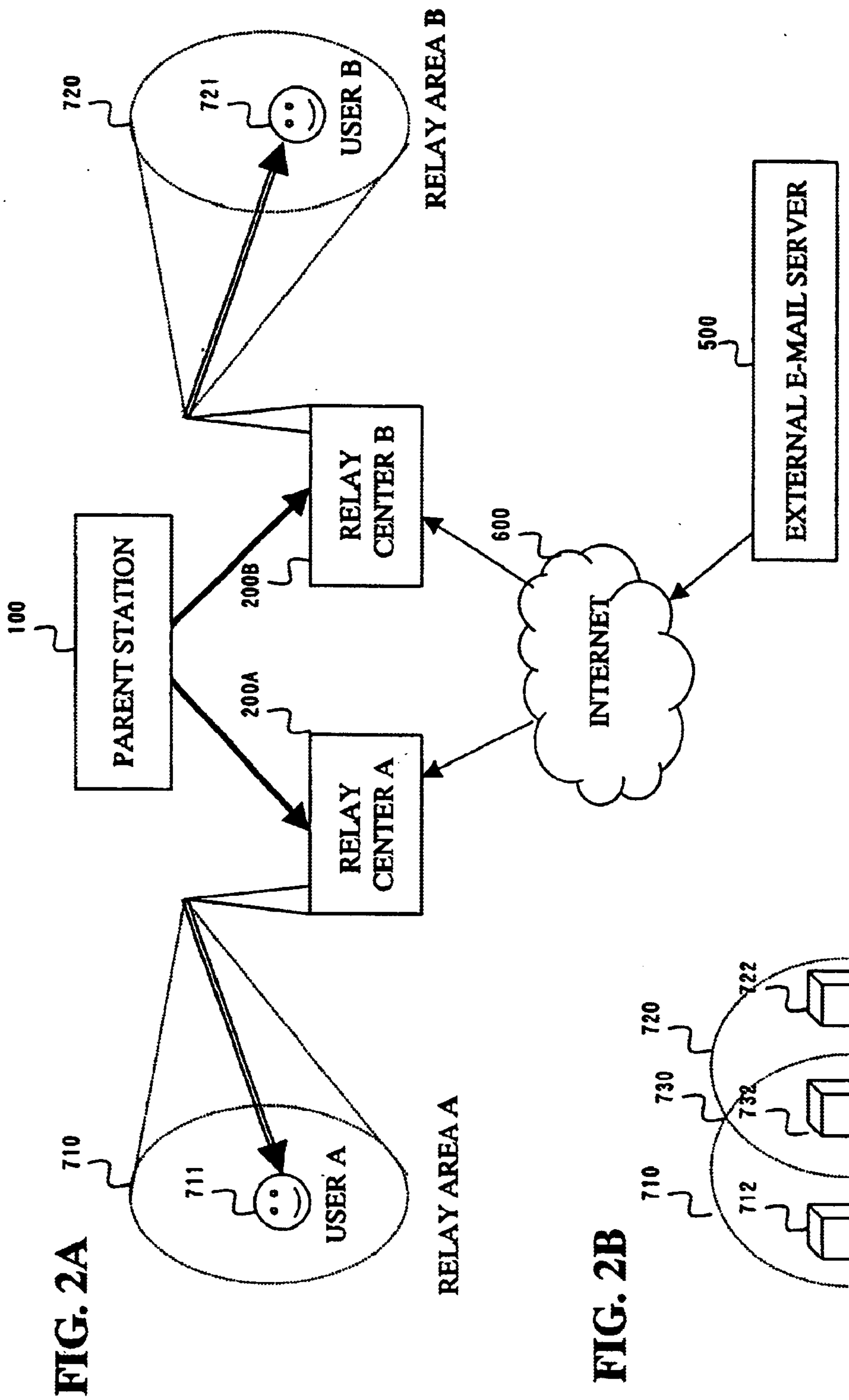
FIG. 2 is an image view showing a relaying method of an e-mail delivery system.

According to FIG. 1, FIG. 2A, and FIG. 9, the following explains about a schematic configuration of a broadcasting system of the invention. The parent station 100 shown in FIG. 1 and FIG. 2A is corresponding to a parent station 1002 shown in FIG. 9, which transmits the broadcasting data to the relay center 200 (relay centers 200A and 200B in FIG. 2A) by means of the microwaves, for example. The relay center 200 is corresponding to the relay centers 1003 to 1006 in FIG. 9 respectively.

The relay center 200A fulfills duties to deliver to a relay area A710 the broadcasting program data received from the parent station 100. Likewise, the relay center 200B fulfills duties to deliver the broadcasting program data to a relay area B720. The relay area is a district per a prefecture, a city, a town, or a village, or a specific district defined for the convenience of the broadcasting waves by the broadcasting company. It is corresponding to areas 1007 and 1008 shown in FIG. 9. It is natural that both the relay areas A710 and B720 are included in parts of whole broadcasting areas that the parent station 100 performs the broadcasting. And a plurality of users belong to the relay area A710, each of those users can receive the broadcasting program within the relay area A710 by means of a terminal 300 such as a television and a radio, for example.

Moreover, the relay center 200(200A, 200B) is also connected with the Internet 600, which can receive from other e-mail server (SMTP) (Simple Mail Transfer Protocol) server) the e-mail data used so far through the Internet 600.

Figure 3:
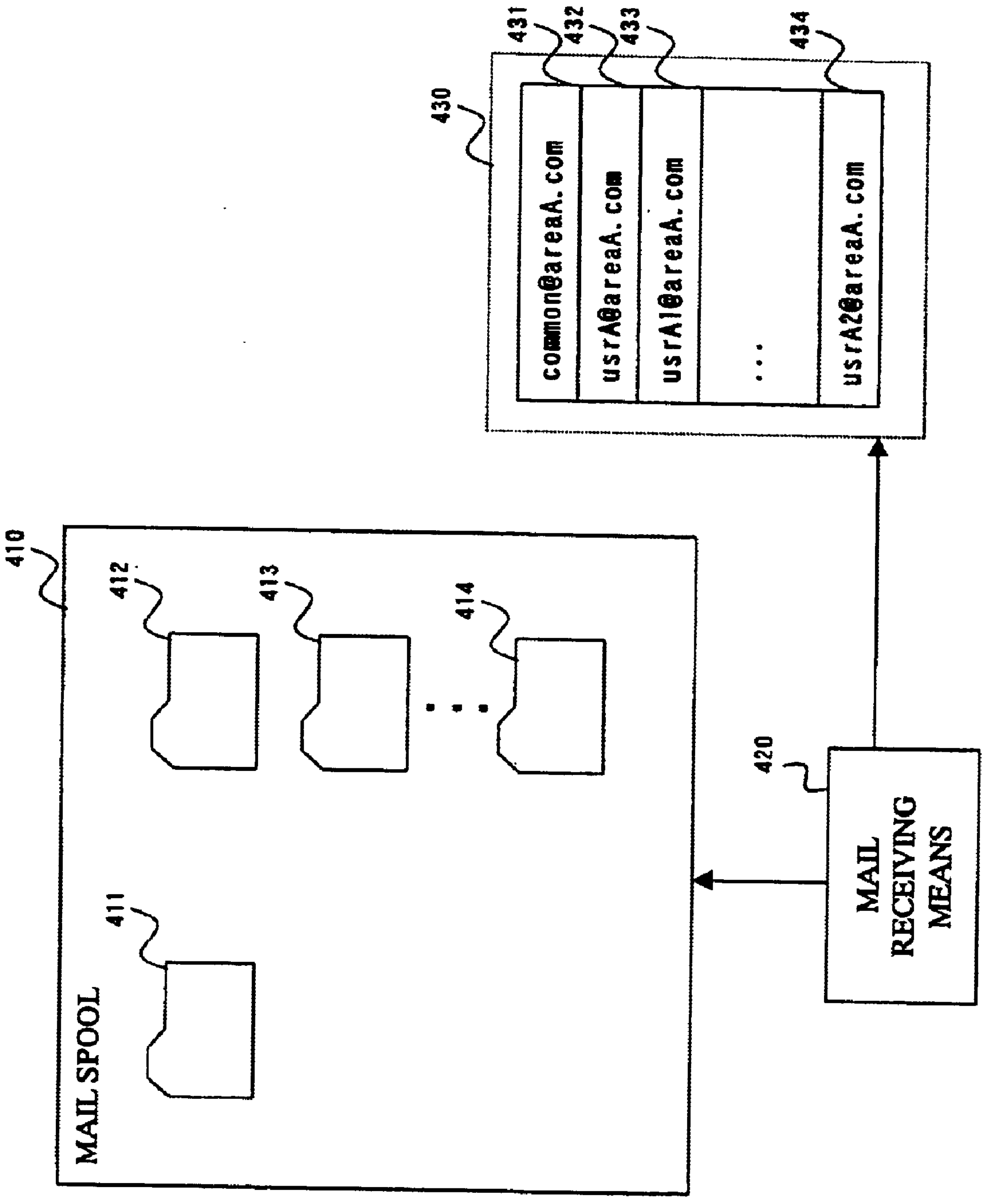
FIG. 3 is a diagram showing a management form of mail data in a relay center.

In the next place, the delivery method of e-mail data utilizing the broadcasting is explained according to FIG. 1, FIG. 2A and FIG.3.

FIG. 3 shows a mail spool 410, mail receiving means 420, and a user list 430: those are provided in an e-mail server 400 of the relay center A(200A) shown in FIG. 2A. The mail spool is a storage area for storing received e-mail data temporarily. An object to be explained here is the relay center 200A shown in FIG. 2A, but even in a case of the relay center 200B or other relay center the same configuration and method are applied.

The user list 430 included in the e-mail server 400 registers e-mail addresses 431 to 434 representing users who belong to the relay area A710 to which the relay center 200A should deliver the broadcasting program data. Each of the e-mail addresses 431 to 434 consists of a personal ID and a district ID, which divides into two by a symbol "@". The part (left side part) before "@" of the each e-mail address 431 to 434 is a personal ID, while the part (right side part) after "@" of the each e-mail address 431 to 434 is a relay area ID. The relay area ID is corresponding to a domain part of a mail address in domain format. Every relay area ID of the e-mail address 431 to 434 has "areaA.com", as shown in the drawing, that expresses that the mail address is included in the relay area A.

The personal IDs are represented by "common" 431, "usrA" 432, "usrA1" 433, and "usrA2" 434. And the users to whom respective personal IDs are allocated belong to the relay area A710. The "common" 431 expresses a specific group, and indicates all users who belong to the relay area A710.

Mail folders 411 to 414 in the mail spool 410 are allocated to the e-mail addresses 431 to 434 respectively. The e-mal data addressed to each e-mail address is stored in the mail folders 411 to 414 respectively. Specifically, it is the mail folder 411 that the e-mail address represented by "common@areaA.com" 431 is allocated to, it is the mail folder 412 that the e-mail address "usrA@areaA.com" 432 is allocated to, it is the mail folder 413 that the e-mail address "usrA1@areaA.com" 433 is allocated to, it is the mail folder 414 that the e-mail address "usrA2@areaA.com" 434 is allocated to.

Supposing that a user transmits e-mail data addressed to userA 711 (which is represented by "usrA@areaA.com" here) who belongs to the relay area A710, the case is explained as follows. The e-mail data is transmitted temporarily to an external e-mail server 500 operated by a provider under contract with the user. The external e-mail server 500 can transmit the e-mail data to an e-mail server 400 in the object relay center by referring to the relay area ID of the domain part of the e-mail data.

After receiving the e-mail data, the mail receiving means 420 refers to the user list 430 and confirms that the mail is addressed to the registered user in the user list 430. And then the received e-mail data is stored in the mail folder 412 allocated to the userA 711.

Subsequently, multiplexing means 202 multiplexes at arbitrary timing the e-mail data in the mail folder 412 and the broadcasting program data received from the parent station 100 by broadcasting receiving means 201, and then transmits the data to the relay area A710 using the broadcasting means 203. The mail multiplexed by the multiplexing means 202 may be deleted from the mail folder at arbitrary timing.

At the time of receiving the broadcasting program data multiplexed with the e-mail data, a terminal 300 of the userA 711, who belongs to the relay area 710, divides the e-mail data from the multiplexed broadcasting data. Next, referring to the address information contained in the e-mail data, the terminal acquires and displays the e-mail data including the address information "usrA@areaA.com". That is to say, the terminal is to display on a display screen the e-mail data as soon as receiving it, for example. Thereby the userA can browse the content of the e-mail data immediately.

As described above, since the location performing the multiplexing of the e-mail data should be the relay center, the number of the e-mail data to be delivered can be limited to those addressed to the users who belong to the relay center at maximum. Accordingly, delivering e-mail data by means of the broadcasting can be carried out practically. By reducing the number of users included in the relay center, the e-mail data to be broadcasted can contain the content of e-mail. Therefore, the invention can deliver the e-mail data effectively involving the sufficient immediacies, which is different from the conventional operation that the incomings of the e-mails are added to the broadcasting.

Besides, the scale of the relay area will vary according to a type of the broadcasting system, the size of e-mail data, and the number of e-mail data, however, the area may include the number of terminals capable of delivering a standard size of e-mail data within a specific time.

The following explanation refers to an example in Japan in case of applying the terrestrial waves digital broadcasting. Suppose that in the terrestrial waves digital broadcasting in Japan, the maximum transmission capacity is 23 Mbps, while the transmission capacity of the standard television program (the interlace method of 480 scanning lines) applies 6 Mbps. The transmission capacity is the logical maximum transmission capacity, and is equivalent to a case that the carrier modifying method should be 64 QAM (Quadrature Amplitude Modulation), the convolution code should be $\frac{7}{8}$, and the guard ratio should be $\frac{1}{32}$.

In this case, 17 Mbps can be used for the broadcasting; that is to say, it can be used for delivering the e-mail data. Moreover, suppose that 1 Kbyte (8192 bits) of e-mail data is delivered to each user, it is possible to transmit $17\times1024\times1024/8192=896$ e-mails per second (it takes about 0.001116 seconds for delivering one e-mail). Accordingly, it is possible to deliver e-mails to 268800 users for five minutes. The number of users is equivalent to the population of a city, a town, or a village. In addition, suppose that the ratio of users to whom the e-mail should be transmitted is 10%, the relay center can accommodate to the extent of 2688000 users; in other words, a relay area can be defined per metropolis or district.

Furthermore, since the e-mail can be delivered to the object relay center automatically by allocating a domain part to a unit of relay center, the conventional technology can be applied to the delivery of the e-mail.

The under-mentioned description is related to the method using a particular e-mail address represented by "common@areaA.com" which has been prescribed before. The particular e-mail address is used in order to utilize the broadcasting communication that is a characteristic of delivering e-mail data by the broadcasting. Specifically the explanation adopting the following concrete configuration is submitted to understand the invention.

Figure 2B:
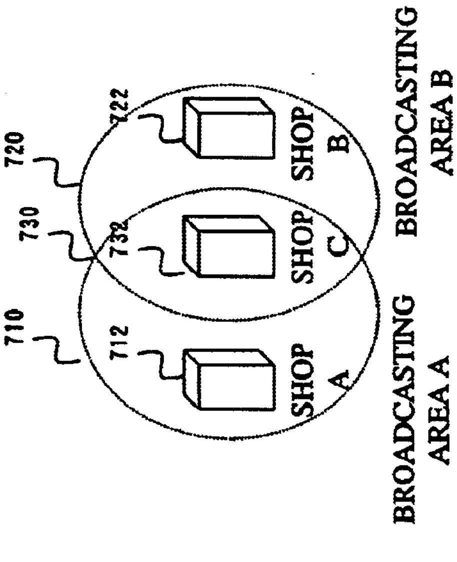

First of all, as shown in FIG. 2B, suppose that there be a overlapped area 730 included in both the relay areas A710 and B720. A shop A 712 is included in the relay area A710, while a shop B 722 is included in the relay area B720. Additionally, a shop C 732 is included in the overlapped area 730 of both the relay areas A710 and B720.

Under such configuration, it is studied that the shop A 712 broadcasts an advertisement. Since the shop A 712 exists in the relay area A710, the advertising object area might be preferred to the relay area A710. In this case, if the advertisement published for the shop A 712 is transmitted as the e-mail addressed to "common@areaA.com", it is delivered to the relay center 200A and broadcasted to all users assigned in the relay area A710. Likewise, when the shop B 722 wants to broadcast the advertisement, the object district is preferred to the relay area B720. In this case, if the advertisement published for the shop B 722 is transmitted as the e-mail addressed to "common@areaB.com", it is delivered to the relay center 200B and broadcasted to all users assigned in the relay area B720.

Moreover, the shop C 732 wants to broadcast the advertisement, the object district is preferred to both the relay areas A710 and B720. In this case, if the advertisement published for the shop C 732 is transmitted as the e-mail addressed to both "common@areaA.com" and "common@araB.com", it is delivered to the relay centers 200A and 200B and broadcasted to all users assigned in the relay areas A710 and B720.

The conventional e-mail system applying the above particular e-mail address has following troubles: suppose that one content of e-mail must be derived to 100 destinations, the delivery side must copy one same content of e-mail 100 times and transmit 100 of e-mail. On the other hand, in case where the user receives the e-mail data by means of the other line, the delivery side had to copy the e-mail data to respective mail folders in advance.

However, the system of the invention does not need those troublesome operations, therefore it is effective.

It is general that the relay center delivers the broadcasting program data to a specific batch of districts. Accordingly, the domain part indicating the relay center can express the district to which the e-mail data is delivered direct. And using the domain part together the particular e-mail address involving the simultaneity is suitable for high regional advertisement like the advertisement of the above-mentioned shop possessing real estate.

Figure 4:
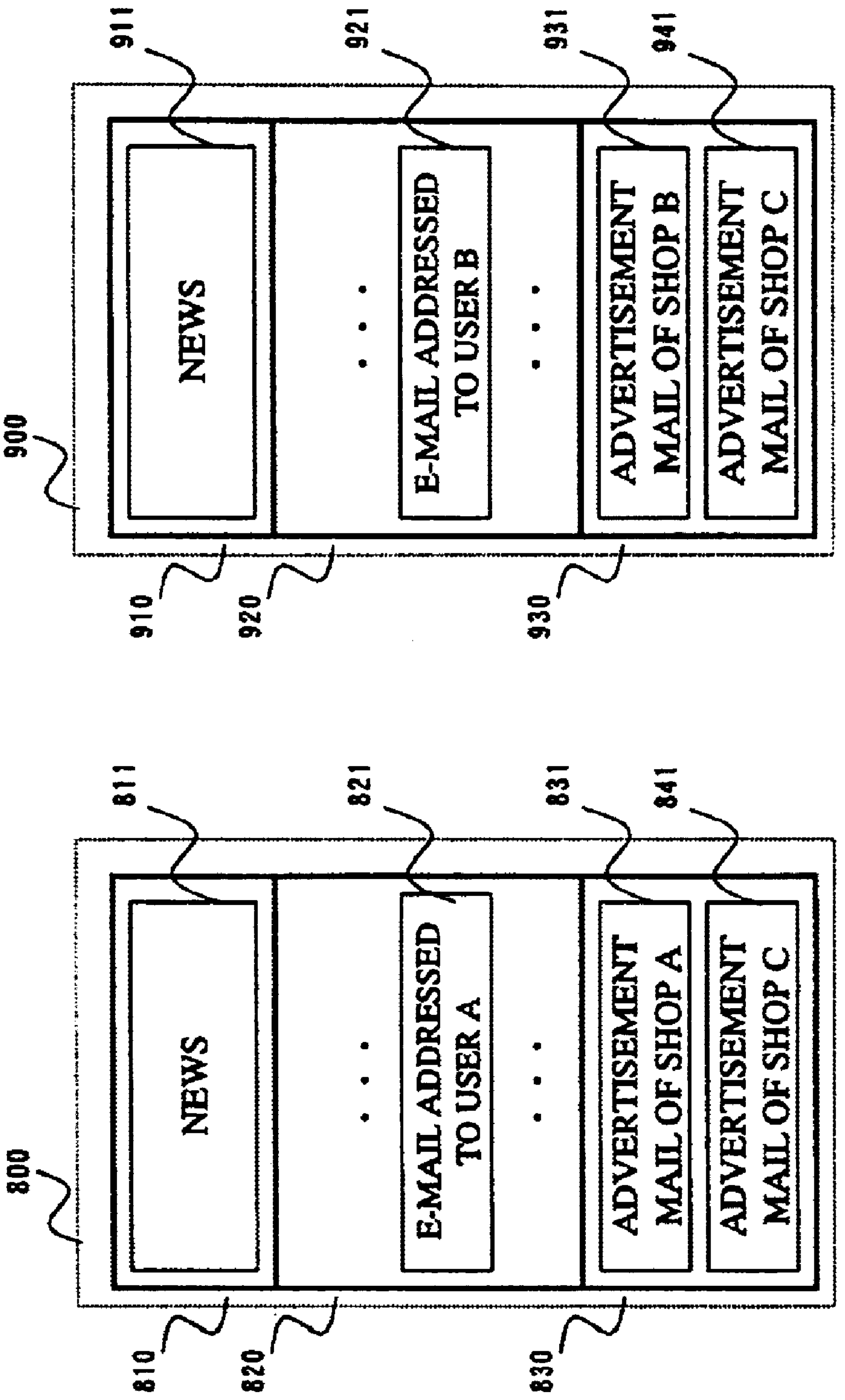
FIG. 4 is a diagram showing an example of broadcasting data broadcasted from a relay center.

In the above-mentioned example, when the shop inserts the advertisement, an example of the broadcasting data is explained hereafter in brief. Broadcasting data 800 and 900 in FIG. 4 schematically shows the content of the broadcasting data for a specific time.

Broadcasting program data 810 composing the broadcasting data 800 indicates that news program 811 is being broadcasted, for example. The broadcasting program data 810 now comprises only one of broadcasting program data, but there is a possibility that a plurality of broadcasting program data exist. Likewise, the broadcasting program data 910 composing the broadcasting data 900 also indicates that the news program 911 is being broadcasted, for example. The broadcasting program data 810 and 910 have the same content. Therefore, the new programs 811 and 911 are the same content. However, it is not necessary in the invention that the broadcasting program data 810 and 910 are the same. Each relay center may edit the broadcasting program data.

E-mail data area 820 composing the broadcasting data 800 stores the e-mail data to be transmitted to a user, for example. The e-mail data 821 is the e-mail addressed to the user A. The user receives the broadcasting data 800, and then receives the mail addressed to him by filtering the e-mail data addressed to him from the e-mail data area 820. The e-mail data area 820 contains only the e-mail data of the number of users included in the relay center 200A at maximum.

Likewise, the e-mail data area 920 of the broadcasting data 900 stores the e-mail data to be delivered to the user individuals, for example. The e-mail data 921 is a mail addressed to the user B.

Common address mail data area 830 of the broadcasting data 800 stores all mail data addressed to all users included in the relay center 200A. As explained before, the common address mail data area 830 includes the advertisement mail data 831 of the shop A and the advertisement mail data 841 of the shop C.

Likewise, the common address mail data area 930 of the broadcasting data 900 stores all mail data addressed to all users included in the relay center 200B. As explained before, the common address mail data area 930 stores the advertisement mail data 931 of the shop B and the advertisement mail data 941 of the shop C.

As described above, since every relay center multiplexes the e-mail data, the respective contents of the broadcasting data are different from each other.

[Embodiment 2]

The following explains about the embodiment 2 of the invention. In the above embodiment 1, it was assumed that the position of a user (a terminal) receiving the e-mail data is fixed. On the contrary, the embodiment 2 refers to an example of delivering e-mail data to a user who is moving. Particularly, the invention can be considered to be applied to a portable telephone that is a mobile terminal, capable of sending and receiving e-mail and permitted to be utilized as a portable television provided with a television tuner.

In order to delivery the e-mail data by means of the broadcasting to a user (a terminal) that is moving as times goes by, the e-mail data must be transmitted to the relay center delivering the broadcasting program data to the relay area that the user is positioned at.

Therefore, in the embodiment 2 an e-mail integrated server 650 is to be provided newly and select a relay center on the basis of the present position of the user. Before explaining about the configuration and the processing of the e-mail integrated server in the embodiment 2 according to FIG. 2, and FIGS. 5 to 8, the state that a user is moving within the relay area of the broadcasting program data is explained hereafter according to FIG. 6.

Figure 6:
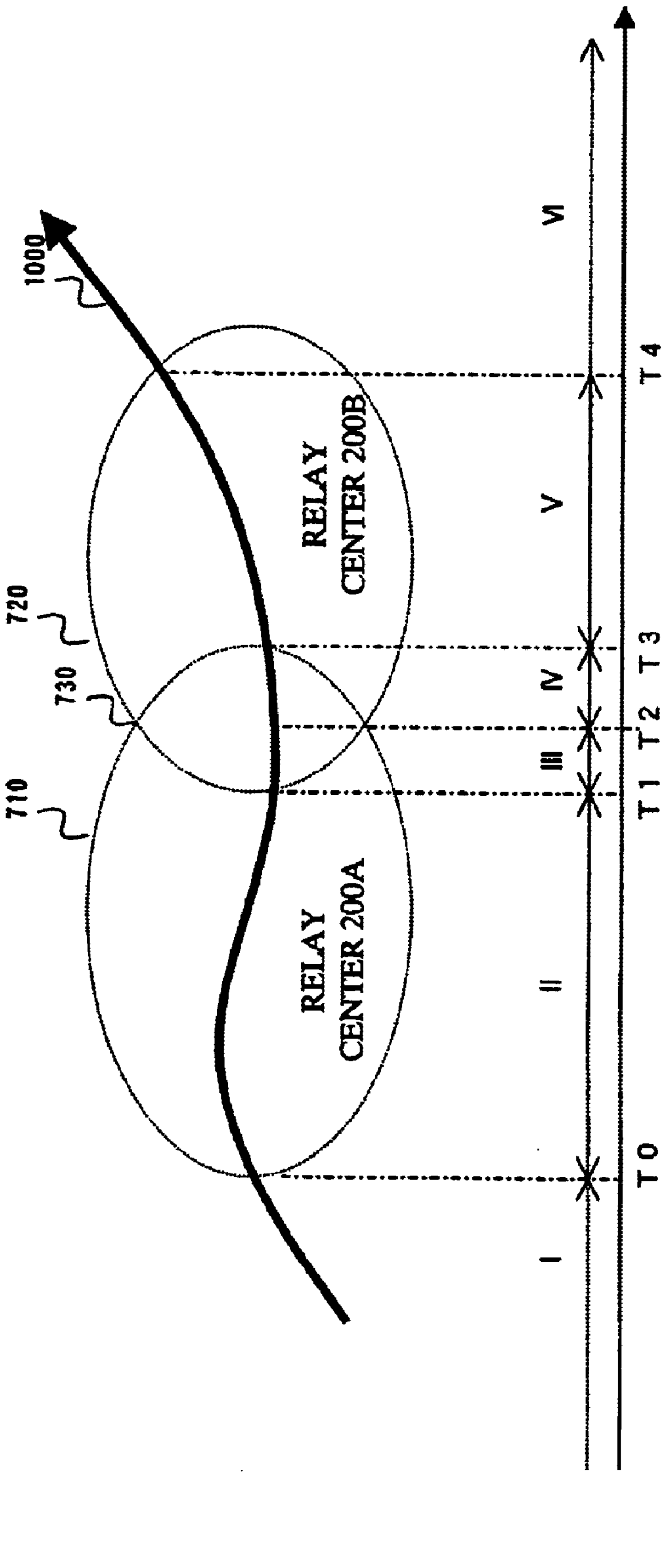
FIG. 6 is a diagram showing the situation that a user is moving within a relay area.

Suppose that the user (terminal 300) to receive the e-mail data is passing by from the relay area A710 covered by the relay center 200A to the relay area B720 covered by the relay center 200B. In FIG. 6, a curve 1000 expresses the user's moving track. The bottom arrow expresses the time elapse, which changes from left to right.

The area at which the user is positioned by the time T0 is not included in either the relay area A710 or in the relay area B720, and this period is defined as a period I. The area at which the user is positioned on and after the time T0 and by the time T1 is included only in the relay area A710, and this period is defined as a period II. In addition, the area at which the user is positioned on and after the time T1 and by the time T2 is included both in the relay area A710 and in the relay area B720. In this area, the intensity of the broadcasting waves from the relay center 200A is stronger than that from the relay center 200B. The period that the user is positioned within this area is defined as a period III.

On and after time T2 and by the time T3, the user is positioned at the area included in both the relay areas B720 and A710. In this are, the intensity of the broadcasting waves from the relay center 200B is stronger than that from the relay center 200A. This period is defined as a period IV. The time T2 indicates the time of the position wherein the intensity of the broadcasting waves from the relay center 200A is the same level as that from the relay center 200B. Therefore, the time T2 might be included in both the period III and the period IV.

On and after the time T3 and by the time T4, the user is positioned at the area included only in the relay area B720, and this period is defined as a period V. On and after the time T4, the user is positioned at the area not included in the relay areas B720 and A710; this period is defined as a period VI.

Figure 5:
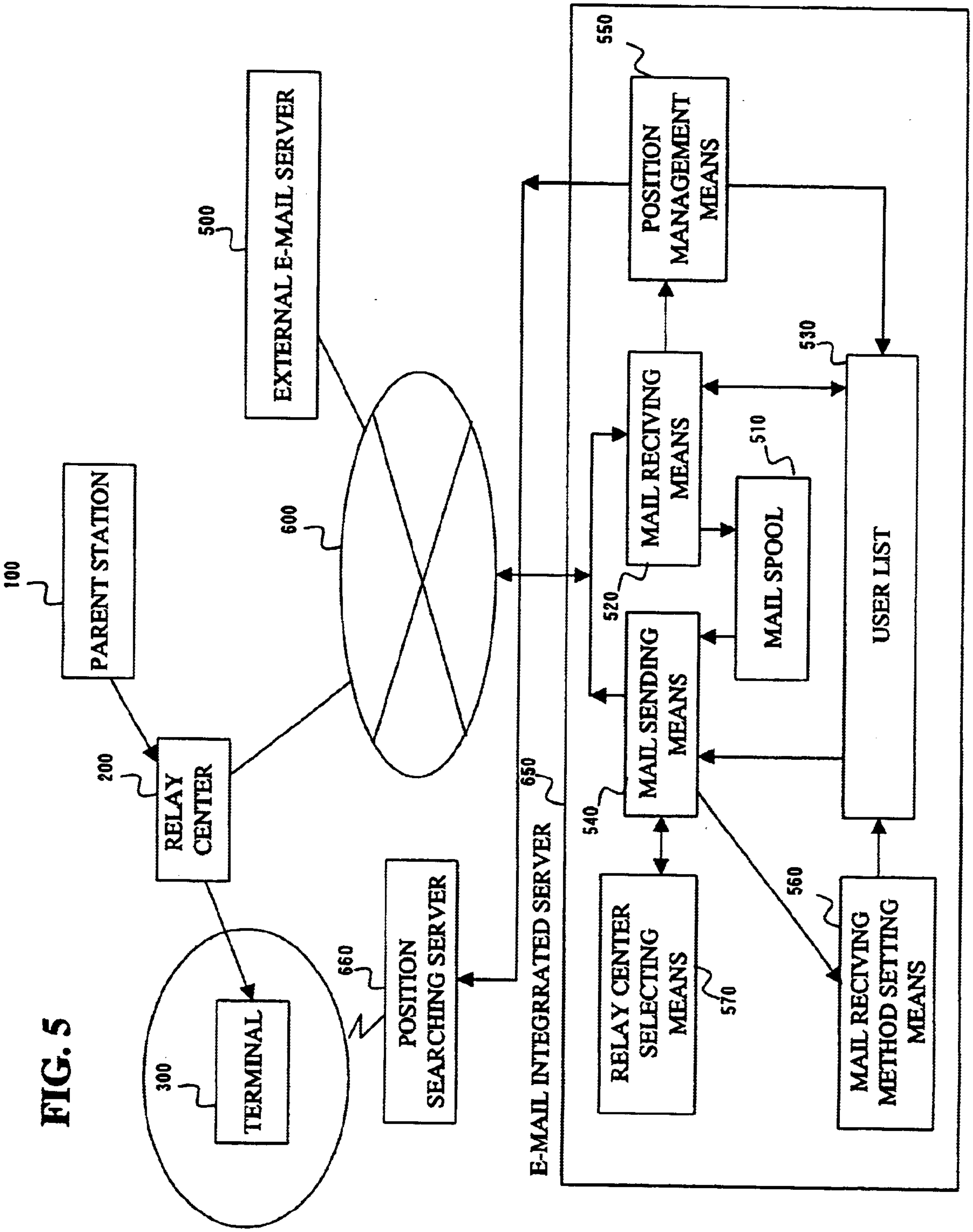
FIG. 5 is a block diagram showing a configuration of an e-mail delivery system.
Figure 7:
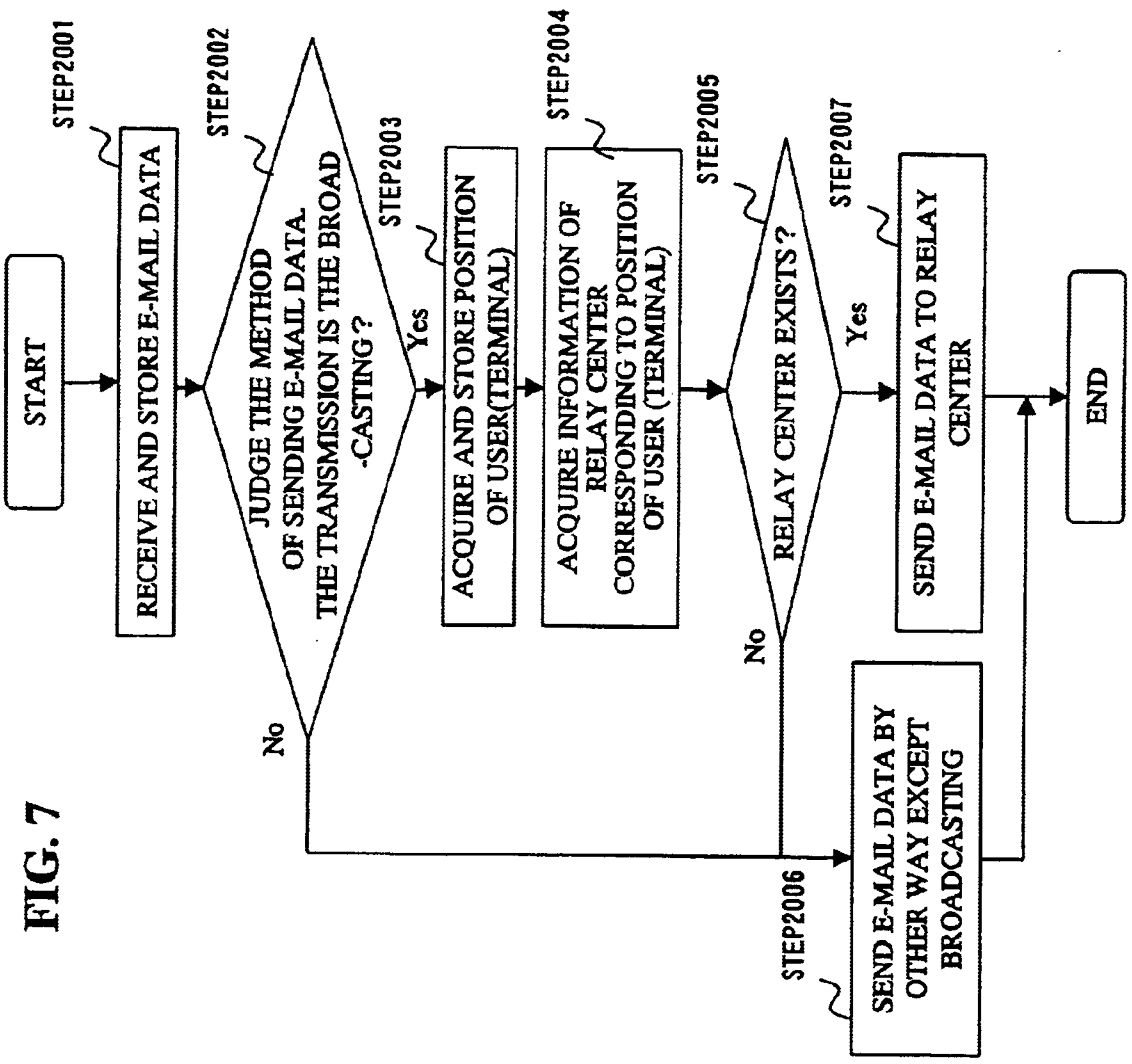
FIG. 7 is a flowchart showing the processing of e-mail integrated server.

Considering the user's moving as defined above, in case where the moving user receives the mail practically by the broadcasting, the processing of the e-mail integrated server 650 is explained hereafter according to the block diagram shown in FIG. 5 and the flowchart shown in FIG. 7. Besides, the parent 100, the relay center 200, and the terminal 200, which are shown in FIG. 5, are configured as well as in FIG. 1.

In the embodiment 1, the e-mail data to be transmitted from the external mail server 500 to the terminal 300 was transmitted direct to the relay center 200 including the terminal 300 via the Internet 600. However, in the embedment 2, the e-mail data to be transmitted to the terminal 300 is transmitted temporarily to the e-mail integrated server 650 from the external e-mail server 500. In this case, the e-mail address of the terminal 300 is represented by "usr1@domain-w.com", and every e-mail data of which the domain part is addressed to "domain-w.com" is to be transmitted to the e-mail integrated server 650 on the basis of the conventional technology.

First of all, at receiving the e-mail data from the external e-mail server, the mail receiving means 520 comprised in the e-mail integrated sever 650 stores the e-mail data in the mail spool 510 while referring to the user list 530. The regulation for storing in the mail spool 510 may be the same as that in the embodiment 1 (FIG. 7, STEP 2001).

The user list 530 comprises e-mail address 531, mail receiving flag 532, position information 533, and terminal ID 534 as shown in FIG. 8. The mail receiving flag 532 indicates whether the e-mail data should be transmitted by the broadcasting or by the other line. When the mail receiving flag 532 is "1", the e-mail data is to be transmitted by the broadcasting. On the other hand, when the mail receiving flag 532 is "0", the e-mail data is to be transmitted by the other line (such as the telephone line, and etc.). The position information 533 expresses the present position of the terminal corresponding to the address of the e-mail data, which is represented by means of the latitude and the longitude. The terminal ID 534 is an ID capable of specifying the terminal 300, to which the telephone number is applied, for example.

The mail receiving means 520 refers to the user list 530 by means of the e-mail address included in the received e-mail data, and then judges the way of transmitting the e-mail data. Since the mail receiving flag 532 corresponding to the e-mail data "usr1@domain-w.com" is "1", the mail receiving means 520 determines that the e-mail data should be transmitted by the broadcasting (FIG. 7, STEP 2002 Yes to 2003). Besides, when the mail receiving flag 532 is "0", the e-mail data should be transmitted by other means except the broadcasting, of which detail will be described later (FIG. 7, STEP 2002 No).

The mail receiving means 520 acquires the terminal ID 537 corresponding to the received e-mail data from the user list 530, and then transmits it to the position management means 550. After receiving the terminal ID corresponding to the e-mail data, the position management means 550 searches the position information of the terminal corresponding to the terminal ID.

Besides the searching is executed by the method adopted by the company providing the services of the mobile communication. That is to say, the position management means 550 transmits the terminal ID to the position searching server 660, and the transmission to the position searching server 660 is executed by the Internet 600, the specific line, or the like. After acquiring the terminal ID, the position searching server 660 sends an inquiry to a base station of the mobile phone, for example. According to the response to the inquiry, the position searching server 660 calculates the position of the terminal, and returns the result to the position management means 550. The above-mentioned processing is operated by the company providing the services of the mobile communication.

The position information of the terminal acquired according to the above steps is stored in the user list 530 by the position management means 550 (FIG. 7, STEP 2003).

Next, the mail sending means 540 refers to the mail spool 510 at a specific timing. Moreover, if the e-mail data was stored in the mail spool 510, the mail sending means 540 refers to the mail receiving flag 532 in the user list 530 by using the e-mail address of the e-mail data. When the value of the mail receiving flag is "1", the mail sending means 540 refers to the position information 533 corresponding to the e-mail address. Subsequently, the mail sending means 540 asks the relay center selecting means 570 of the address of the relay center that is broadcasting over the place indicated by the position information 533, and then acquires the address of the corresponding relay center (FIG. 7, STEP 2004).

Besides, the processing for acquiring the address of the relay center from the relay center selecting means 570 is described in brief as follows. The relay center selecting means 570 is provided with the database storing the position information and ID of the relay center, and by offering a specific position coordinates, can answer the address of relay center nearest to the specific position coordinates. The position information to be given to the relay center selecting means is to adopt those stored in the information coordinates 533.

In response to the inquiry from the mail sending means 540, the relay center selecting means 570 is to response as follows according to the position of the user as shown in FIG. 6:

a) When the user is positioned at the period I, the relay center selecting means 570 responds that there is no relay center.

b) When the user is positioned at the period II, the relay center selecting means 570 responds that the relay center 200A is corresponding to the position coordinates.

c) When the user is positioned at the period III, both the relay centers 200A and 200B are corresponding to the position coordinates and the relay center selecting means 570 responds that the relay center 200A is corresponding to the position coordinates.

d) When the user is positioned at the period IV, both the relay centers 200A and 200B are corresponding to the position coordinates and the relay center selecting means 570 responds that the relay center 200B is corresponding to the position coordinates.

e) When the user is positioned at the position corresponding to the time T2, the relay center selecting means 570 responds that the relay center 200B is corresponding to the position coordinates, for example p f) When the user is positioned at the period V, the relay selecting means 570 responds that the relay center 200B is corresponding to the position coordinates.

g) When the user is positioned at the period VI, the relay center selecting means 570 responds that there is no relay center corresponding to the position coordinates.

Moreover, when the relay center selecting means 570 responds that there is no relay center, that is to say, when the user is positioned in the period I and in the period VI in the abovementioned example, the e-mail data is transmitted to the user without using the broadcasting, the details of which will be explained later (FIG. 7, STEP 2005 No to 2006).

If the relay center selecting means 570 responds that there is a corresponding relay center, that is to say, when the user is positioned at either one of the periods II, III, IV or V in the above-mentioned example, the mail sending means 540 transfers the mail to the relay center included in the response of the relay center selecting means 570 (FIG. 7, STEP 2007). The destination of the transfer e-mail that is used for transferring the e-mail is addressed to a particular user assigned to the e-mail server provided with the relay center, for instance, a provisional user like "mobile@areaA.com". And the e-mail data to be transmitted to the terminal 300 is attached to the transfer e-mail, which is transmitted.

When the mail receiving means 420 of the relay center 200 receives the transfer e-mails addressed to "mobile@areaA.com", respective attached files are taken out as an independent file and then stored in the corresponding mail spool 410. After that, the relay center 200 multiplexes the broadcasting program data with the e-mail data and transmits them to the terminal, the processing of which is the same as in the embodiment 1.

As described above, the e-mail integrated server registers the position of the user (terminal) and the e-mail data is transferred to the relay center of which the relay area includes the position, thereby it is possible to deliver the e-mail data to the moving user utilizing the broadcasting.

Next, a case of transmitting the e-mail data by other ways excluding the broadcasting is explained in brief. The case of transmitting the e-mail data by other ways excluding the broadcasting is the processing for the cases where the mail receiving flag 53 is "0" or the relay center cannot be found at STEP 2006, which corresponds to the STEP 2006 in FIG. 7. In this case, the user (terminal) accesses direct to the e-mail integrated server 650 by means of the Internet connecting function provided with the terminal, and asks the mail sending means 540 if there is e-mail data addressed to the user or not. In response to the inquiry, the mail sending means 540 refers to the mail spool 510, and if there is e-mail data addressed to the user, transmits the e-mail data to the user via the Internet. According to the processing, the user can obtain the e-mail data by means of the conventional way.

Since the invention comprises the other method of transmitting e-mail data except the broadcasting, even the e-mail data that the broadcasting cannot transmit can be delivered to the user certainly. It is possible to cope with the delay of delivering in case of mass of e-mail data or the failure in receiving the mail.

Besides, though the above examples refers to the case where the relay center selecting means 570 is included in the e-mail integrated server 650, it is needless to say that the relay center selecting means 570 may be arranged to be independent from the e-mail integrated server 650 and to be available for a plurality of e-mail servers. In this case, it is possible to reduce the operations for updating the database according to the specification change of the relay center.

In addition, researching the position information of the terminal by the position management means is executed by the method adopted by the company providing the services of the mobile communication, but it is not restricted to this. That is to say, the terminal may install the GPS function (Global Positioning System) and inform the position management means of the information (by means of e-mail or the like) at a specific timing.

[Embodiment 3]

The mechanism where the user can select either one of the broadcasting or other line as the way of receiving the e-mail data is described hereunder. Specifically, when the data transfer rate of the Internet connected with the terminal is lower than that of the broadcasting or when the receiving status is changing according to the moving of the terminal, the user can change the receiving route of the e-mail data on purpose, thereby the system is arranged so as to select a proper receiving route.

In this case, the e-mail integrated server 650 further comprises mail receiving method setting means 560. Specifically, the user connects the terminal with the e-mail integrated server 650 by means of the Internet connecting function, and transmits to the mail receiving method setting means 560 using the mail sending means 540 the information to the effect that the e-mail data is expected to be transmitted by the broadcasting or other line.

At this time, when the information that the "line" is selected for receiving the e-mail is transmitted, for example, the mail receiving method selecting means 560 changes to 1 the mail receiving flag 532 corresponding to the connected user of the user list 530.

Therefore, even when the e-mail data addressed to the specific user arrives at the e-mail integrated server 650, the mail sending means 540 transmits the e-mail data by the broadcasting. In result, the user is to receive the e-mail data from the e-mail integrated server 650 via the other line as in the conventional way.

Additionally, when the information that the "broadcasting" is selected for receiving the e-mail is transmitted, for example, the mail receiving method selecting means 560 changes to 0 the mail receiving flag 532 corresponding to the connected user of the user list 530. In this case, the mail sending means 540 refers to the user list 530 at a specific time interval, if the mail receiving flag 532 is found to be "0", the e-mail data addressed to the e-mail address corresponding to "0" are searched from the mail spool 510. At this time, if there is the corresponding e-mail data in the e-mail spool, the mail sending means 540 obtains the position information of the terminal corresponding to the e-mail address of the e-mail data passing through the position management means 550. After that, the e-mail data is transmitted to the corresponding relay center 200 as described in the embodiment 2, and consequently the e-mail data is transmitted to the terminal.

Since it is arranged that the route for transmitting e-mail data can be freely changed according to the user's intension, the invention can meet with even a case where the receiving status of the broadcasting changes as the user moves. Thereby, it is possible to assure the route for receiving the e-mail data quickly and in free of charge: for instance, in the area under good receiving condition the e-mail data should be received by the broadcasting, while in the area under bad receiving condition the e-mail data should be received by the other line.

Besides, the invention may be arranged so as to send the homepage to the user by the mail receiving method setting means 560 and change the transmitting route on that home page by the user.

Effect of the Invention

Under the configuration as described above, the system is to broadcasts only the e-mail addressed to users included in the scope of the broadcasting of the relay center. Consequently, the following effects are generated.

First of all, in the e-mail delivery system of embodiment 1 the relay center can multiplex e-mail data addressed to individuals, so that the number of users to be accommodated in the broadcasting data can be reduced and the time interval for delivering e-mail by means of the broadcasting can be shorten.

In the second place, in the e-mail delivery system of embodiment 1 the relay center can multiplex only the data valid for the area to be a broadcasting object, thereby it is possible to deliver advertisements per district.

In the third place, since the e-mail delivery system in embodiment 1 comprises the mail transmitting method except the broadcasting, even e-mail that cannot be transmitted by the broadcasting can be sure to deliver the users. In case of delivering mass of the e-mail, the invention can cope with the delay of delivery or the failure to receive the e-mail by the user.

In the fourth place, in the e-mail delivery system in embodiment 2 the position of user is to be registered and the e-mail is to be delivered to the relay center near to the position, so that the e-mail addressed to individuals can be delivered to even moving users efficiently by means of the relay broadcasting.

In the fifth place, in the e-mail delivery system in embodiment 2 the relay center selecting means can be shared by a plurality of mail servers. That is to say, since the information of the relay centers can be managed in a centralized manner, if the relay center is added, or if the relaying scope is changed, it is possible to exclude the cost for updating the database.

What is claimed is:

1. A broadcasting system comprising a parent station and relay centers for relaying broadcasting program data broadcasted by the parent station to relay areas, respectively, the system comprising:

an e-mail integrated server including a mail receiving unit operable to receive e-mail data addressed to a terminal in one of the relay areas, a position management unit operable to acquire position information showing a current position of the terminal to which the e-mail data received by the mail receiving unit is to be transmitted, a relay center selecting unit operable to select a relay center corresponding to the position information acquired by the position management unit, and a mail sending unit operable to send the e-mail data received by the mail receiving unit to the relay center selected by the relay center selecting means; and a multiplexing unit in the selected relay center operable to multiplex the e-mail data addressed to the terminal with the broadcasting program data, wherein the multiplexing unit is in each of the relay centers.

2. A broadcasting system according to claim 1, wherein each relay area includes the number of terminals to which the e-mail data can be delivered within a specific time.

3. A broadcasting system according to claim 1, wherein each relay center has respective domain parts different from each other.

4. A broadcasting system according to claim 1, wherein the mail sending unit transmits the e-mail data received by the mail receiving unit to the relay center on the basis of a mail receiving flag representing whether the e-mail data should be transmitted by means of the broadcasting or not.

5. A broadcasting system according to claim 4 wherein the e-mail integrated server is provided with a mail receiving method setting unit operable to change the mail receiving flag on the basis of an instruction of a user.

6. An e-mail integrated server transmitting e-mail data to a relay center multiplexing the e-mail data and broadcasting program data broadcasted by a parent station, the e-mail integrated server comprising:

a mail receiving unit operable to receive e-mail data addressed to a specific terminal;

a position management unit operable to acquire position information showing a current position of the terminal to which the e-mail data received by the mail receiving unit is transmitted;

a relay center selecting unit operable to select a relay center corresponding to the position information acquired by the position management unit; and a mail sending unit operable to send the e-mail data received by the mail receiving unit to the relay center selected by the relay center selecting unit, wherein the selected relay center includes a multiplexing unit operable to multiplex the e-mail data addressed to the terminal sent by the mail selecting unit with the broadcasting program data.

7. An e-mail integrated server according to claim 6, wherein the mail sending unit sends the e-mail data received by the mail receiving unit to the relay center on the basis of a mail receiving flag representing whether the e-mail data is sent by means of the broadcasting or not.

8. An e-mail integrated server according to claim 7, further comprising a mail receiving method setting unit operable to change the mail receiving flag on the basis of an instruction of a user.

9. An e-mail delivery method of multiplexing broadcasting program data with e-mail data and then delivering the multiplexed data, the method comprising the steps of:

receiving e-mail data;

acquiring position information showing a current position of a terminal to which the e-mail data received in the receiving step is to be transmitted;

selecting a relay center corresponding to the position information acquired in the acquiring step, the selected relay center configured for relaying the broadcasting program data to a relay area where the terminal is located; and sending the e-mail data received in the receiving step to the relay center selected in the selecting step; and receiving the broadcasting program data from the parent station by the relay center;

multiplexing the e-mail data and the broadcasting program data by the relay center, the e-mail data being received by the relay center, the broadcasting program data being received in the step of receiving the broadcasting program data; and delivering to the relay area the broadcasting program data multiplexed with the e-mail data in the multiplexing step.

* * * * *